Figure 4:
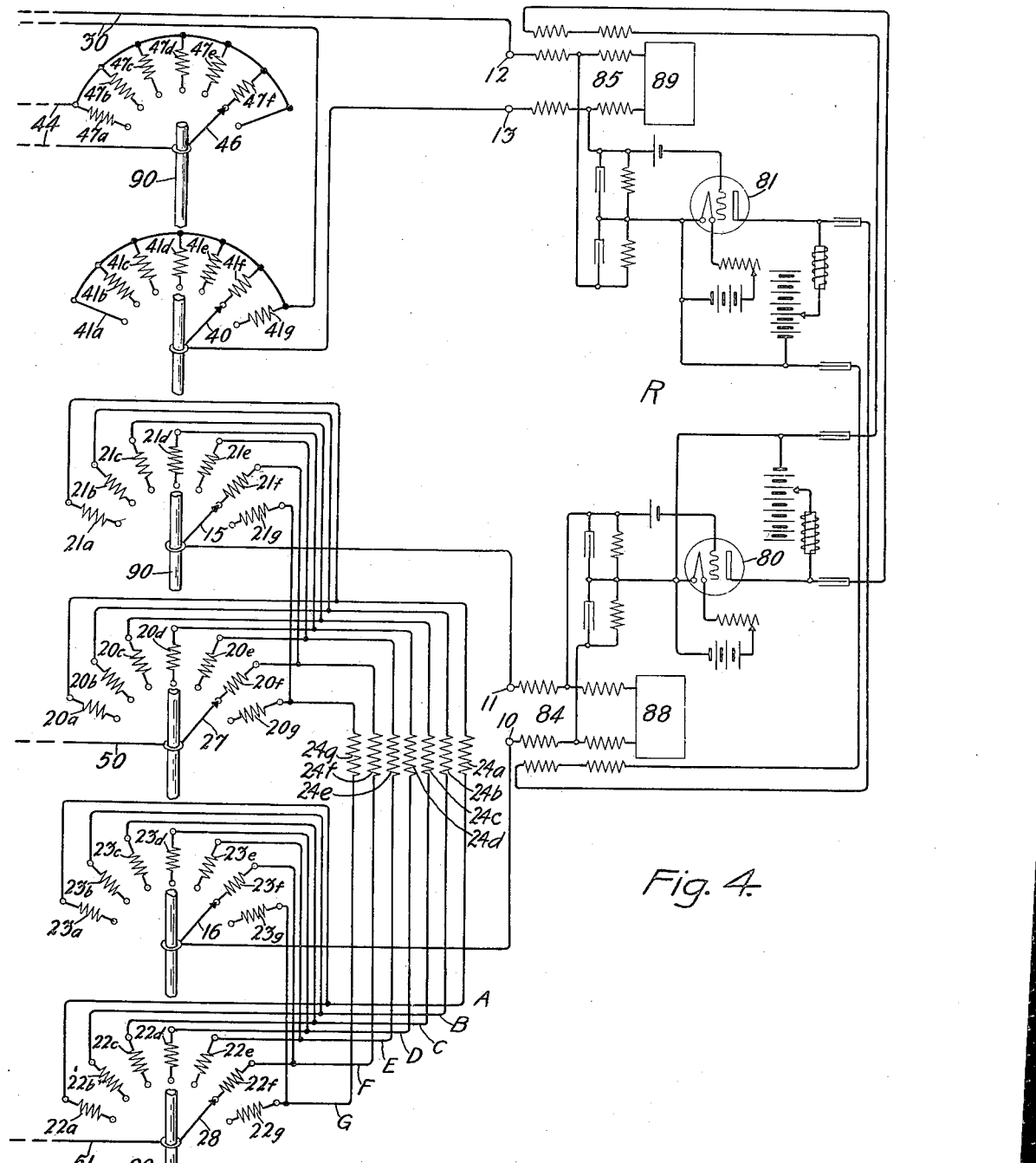

Jan. 16, 1923.  1,442,455
D. F. WHITING.
TRANSMISSION MEASURING CIRCUITS AND METHOD.
FILED OCT. 22, 1919.  2 SHEETS-SHEET 1
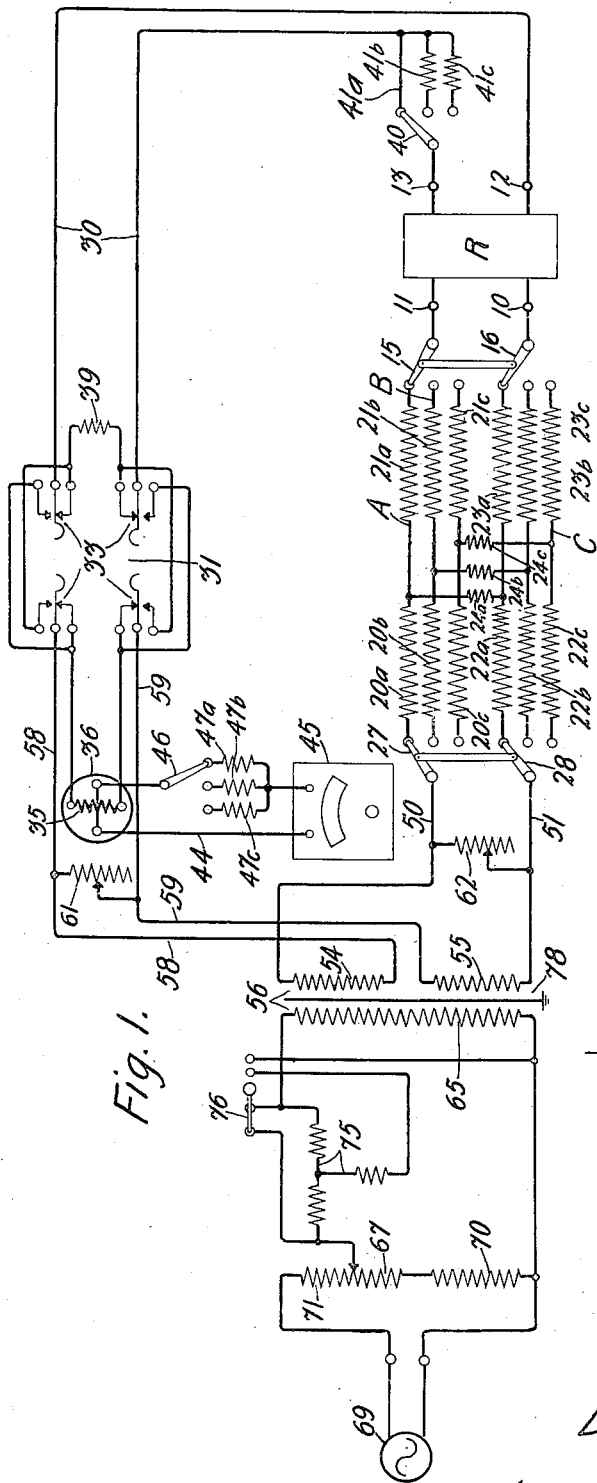
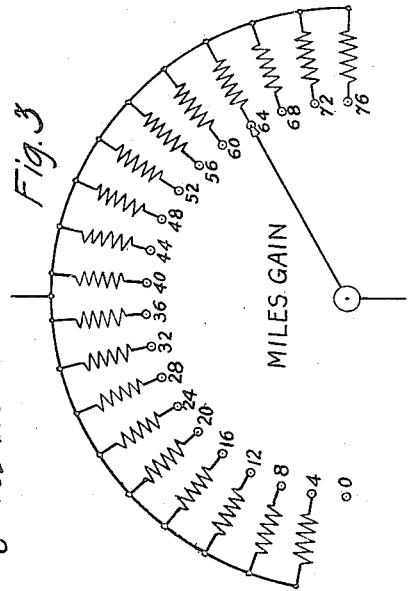
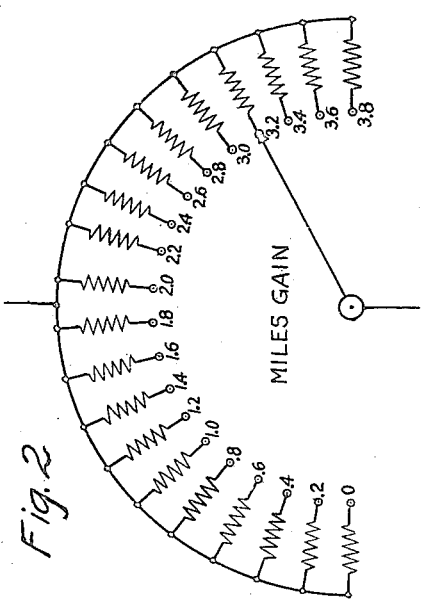
Inventor:
Donald F. Whiting
by W. E. Beatty Atty Inventor:
Donald F. Whiting
by W. E. Beatty. Att'y Patented Jan. 16, 1923.

1,442,455

UNITED STATES PATENT OFFICE.

DONALD F. WHITING, OF NEW YORK, N. Y., ASSIGNOR TO WESTERN ELECTRIC COMPANY, INCORPORATED, OF NEW YORK, N. Y., A CORPORATION OF NEW YORK.

TRANSMISSION-MEASURING CIRCUITS AND METHOD.

Application filed October 22, 1919. Serial No. 332,377.

*To all whom it may concern:*

Be it known that I, DONALD F. WHITING, a citizen of the United States, residing at New York, in the county of Bronx, State of New York, have invented certain new and useful Improvements in Transmission-Measuring Circuits and Methods, of which the following is a full, clear, concise, and exact description.

This invention relates to circuits and methods for measuring the transmission of electrical apparatus, and more particularly to the measurement of repeater gains.

It is an object of the invention to provide a circuit which will measure the transmission through apparatus to be tested with a high degree of accuracy and which, although having a wide range of usefulness, will require a minimum number of circuit elements.

The circuit embodying the invention as described and illustrated herein is particularly adapted for measuring gains but it can be used also for measuring small losses. The circuit comprises two transmission paths adapted to be alternately connected to a thermocouple and meter for indicating the transmitted current. One of the paths includes the repeater to be tested and impedances which may be adjusted to values corresponding to the impedances of the real lines between which the repeater is adapted to be used. It also includes an arrangement of impedances including some of the first mentioned impedances for introducing a loss in this path. This loss will usually be greater than the gain of the repeater. The other path includes a variable impedance in shunt to the impedance of the thermocouple heater when the latter is connected to that path, whereby a loss may be introduced in that path equal to the difference between the loss and the gain of the other path. A resistance equal to the resistance of the thermocouple heater is adapted to be connected to the path to which the thermocouple is not connected.

Alternating current from a suitable source is passed in series through the input ends of the two paths, so that all of the current passing through one of the paths must go through the other path, although all of this current does not pass through the thermocouple heating element, because each path contains conducting elements effectively in shunt to the thermocouple. The shunt resistances in one or both of the paths are adjusted until the indicating instrument gives the same deflection when connected to one path as when connected to the other. These adjustments are preferably made by means of dial switches which are calibrated in terms of some convenient unit of transmission, such as the increase experienced when one mile of standard cable is removed from a telephone line.

This circuit is also adapted to measure small losses as, for example, the transmission of a repeater at frequencies other than those which it is designed to amplify. When the losses are so large, however, that the resultant currents are not sufficient to give an indication in the meter associated with the thermocouple, it may be necessary to insert an amplifier between the thermocouple heater and the measuring circuit or to substitute a more sensitive, although less accurate device, such as the telephone receiver shown in the patent to John F. Toomey, No. 1,364,158, granted January 4, 1921.

In this connection it should be noted, however, that exact calibration of the thermocouple and meter is not necessary, since its functions are only to indicate when the transmission through the repeater approximates that of service conditions, and to indicate when the transmission through the two paths is equal. It will do the latter very accurately without being calibrated in terms of absolute units of current or voltage.

The invention of this application is in the nature of an improvement on the circuit shown in No. 1,364,158, above referred to.

The invention will be more fully understood from the following detailed description and claims taken in connection with the accompanying drawings in which Fig. 1 is a diagrammatic view of a circuit embodying the invention; Fig. 2 is a detail view of an adjustable resistance employed in Fig. 1; Fig. 3 is a similar view of another resistance; and Fig. 4 is a detail view of the right-hand end of Fig. 1 showing a form of two-way repeater which may be tested.

Referring to the drawings by reference characters, the repeater or other apparatus R, which is to be tested, has its input terminals connected to the terminals 10, 11 and its output terminals connected to the terminals 12, 13. By means of the switches 15, 16, a plurality of artificial lines, A, B, C, D, E, F, G are adapted to be connected to terminals 10, 11. To simplify the drawing only three of these are shown in Fig. 1. Each artificial line comprises four series resistances and a shunt resistance in order to simulate as nearly as possible the attenuation and impedance characteristics of a real line. Satisfactory results can be obtained, however, by using a less number of series resistances. These series resistances for the line A are indicated by the numerals 20$^a$, 21$^a$, 22$^a$, and 23$^a$, and the shunt resistance by numeral 24$^a$. Similar numerals with letters $b$, $c$, etc., added are employed to designate corresponding resistances in lines B, C, etc. Switches 27, 28 are employed for connecting the left-hand ends of these lines to a source of alternating current later to be described.

Each of the lines A, B, C, etc., when viewed from the terminals 10, 11, has an impedance differing from the impedance of the other lines and corresponding to the impedance of a real line to which some repeater is designed to be connected. When viewed from the opposite ends, however, all of the lines A, B, C, etc., have the same impedance value when connected to repeaters having the impedance for which they are adapted. In other words, all of the lines impose the same attenuation on alternating currents impressed thereon from the source above referred to. In the circuit illustrated each line was designed to impose a loss of fifteen miles.

The output circuit 30 of the repeater can be connected by interchanging key 31 either to the heater element 35 of the thermocouple 36 or to a resistance 39 having the same resistance as element 35. Key 31 has four contact arms 33 which are simultaneously operated to effect a reversal. The impedance of the output circuit may be varied by means of switch 40 to correspond to the impedance of the real line into which the repeater being tested is adapted to work. When switch 40 is in the position shown in Fig. 1 the impedance of the circuit looking to the right from terminals 12, 13 is that of resistance 39. This impedance is increased in successive steps by adding series resistances 41$^a$, 41$^b$, 41$^c$, etc., 41$^a$ representing zero resistance.

The thermocouple output circuit 44 is connected to an indicating instrument 45 which may be a microammeter. The resistance of this circuit may be varied for a purpose to be described, by switch 46, which connects into the circuit one of the resistances 47$^a$, 47$^b$, etc.

Referring now to the input portion of the circuit it will be seen that switches 27 and 28 are associated with conductors 50 and 51, which are connected to the outside terminals of windings 54 and 55, which form the secondary of transformer 56. To the inside terminals of windings 54 and 55 are connected conductors 58 and 59. The conductors 58 and 59 are alternately connected to the resistance 39 or the thermocouple 36 by the reversing key 31. An adjustable resistance 61, shown in detail in Fig. 2, is connected in shunt across conductors 58 and 59, and a similar adjustable resistance 62 is connected across conductors 50 and 51.

It will be noted that the path comprising leads 50 and 51, the path comprising leads 58 and 59 and the secondary windings 54 and 55 are all in series. This insures that at any given setting, the same current enters the path containing the device to be measured and the direct path to the measuring instrument.

The primary 65 of transformer 56 is connected through potentiometer 67 to a source of alternating current 69. This source may be a vacuum tube oscillator adjustable as to the frequency supplied and having an impedance of 1000 ohms, for example. In order to confine the impedance of the circuit looking to the left from primary 65 within rather narrow limits above and below 1000 ohms, the potentiometer 67 comprises a fixed resistance 70 which may be 1000 ohms and a variable resistance 71 which may be 3000 ohms. In any case where the potentiometer does not reduce the amplitude of the current sufficiently, the artificial line 75 may be interposed by throwing switch 76 to the right. This will reduce the current and, at the same time, maintain the impedance presented to winding 65 at the desired value.

A grounded shield 78 is provided to act as a short circuit to ground for any longitudinal currents which may be transmitted from the source and which otherwise might pass through transformer 56 on account of capacity effects between the windings, as, for example, in case both the oscillator and repeater have grounded connections.

Referring to Fig. 4, a form of two-way repeater has been shown connected to the terminals 10, 11, 12 and 13. This repeater set comprises essentially two oppositely directed one-way repeaters 80 and 81, hybrid transformers 84 and 85 and artificial networks 88 and 89 designed to balance the lines between which this set is to be interposed. This two-way repeater is described in detail in U. S. Patent to B. W. Kendall, Patent No. 1,216,136, dated February 13, 1917. It is evident that to prevent singing it will be necessary to adjust the impedance of the artificial lines of the testing circuit so that they will balance the networks 88 and 89. This is done by the operation of switches 15, 16, 27, 28 and 40. As shown in Fig. 4 these switches and switch 46 may be arranged to be operated by a common shaft. In some cases it may be desirable to operate switches 40 and 46 separately, as, for example, in testing a repeater which is designed to work between lines having substantially different impedance values.

In operation the repeater R or other apparatus to be tested is connected as shown in Fig. 4. Switches 15, 16, 27, 28, 40 and 46 are operated to place the repeater between the impedances between which it is designed to work in actual use, and to adjust the sensitivity of the indicating instrument so that the repeater will be operating under the proper degree of load. Key 31 is in position to connect the transmission path containing the repeater to the resistance 39 and the transmission path 58, 59 to the thermocouple. The resistance 62 should be set roughly at the value corresponding to the gain that the repeater is expected to give.

The oscillator or other source of alternating current is adjusted to the desired frequency, and potentiometer 67 is adjusted until the milliammeter 45 gives mid-scale deflection. The circuit is so designed that with mid-scale deflection of the meter, the repeater is working with a load such as it is designed to carry in actual practice. This load is below its maximum capacity by a predetermined margin of safety, and may be made constant for repeaters which are designed to be operated on lines of different impedances.

The purpose of the resistances $47^a$, $47^b$, $47^c$, etc., will now be explained. As above indicated it is desirable to test repeaters when they are carrying the load which they are designed to carry in practice. When the impedance of circuit 30 is changed, it is therefore necessary to maintain the energy in this circuit constant rather than to maintain the current constant. The relation of resistances $47^a$, etc., to resistances $41^a$, etc., is such that when the meter, if connected to circuit 30, gives mid-scale deflection, the energy consumption in circuit 30 is constant for all positions of switch 40. If the impedance of circuit 30 increases in geometric progression, the resistance of circuit 44 should decrease in a corresponding progression. This is accomplished semi-automatically, since the controlling switches are operated by a common shaft.

Resistance 61 is shown in detail in Fig. 2. As illustrated, it is calibrated to measure gain in steps of .2 mile up to 3.8 miles. When in zero position its resistance bears such a relation to the resistance of the thermocouple that it imposes a loss on the path 58, 59 equal to the loss imposed on the other path by one of the artificial lines A, B, C, etc. This may be fifteen miles as above stated. It is evident that if the meter gives mid-scale deflection with the resistance 61 in zero position and also when key 31 is operated to connect the output of the repeater to the thermocouple, the repeater is giving zero gain, since an equal loss is imposed on both paths.

The repeater, however, may be giving a gain up to say 80 miles, and as it is desirable to use the resistance 61 for measuring smaller variations, resistance 62 is provided for the purpose of imposing additional losses on the path containing the repeater. Resistance 62 may be calibrated in steps of four miles up to 76 miles, as shown in Fig. 3. Losses imposed by this resistance will be read on the dial as miles gain of the repeater.

Assume that position 24 miles is found to cause the meter to indicate the nearest to mid-scale when it is connected to the repeater output, and the source of current is adjusted as above. The exact deflection is noted. Key 31 is again operated to reverse the positions of the thermocouple and resistance 39, and resistance 61 is adjusted until the deflection of the meter is the same as when connected to the repeater output. If, for example, this occurs when resistance 61 is set at 2.2 miles, the repeater gain is 24 miles plus 2.2 miles or 26.2 miles. It should be noted that in order to make the dials read in miles gain, the resistance values of resistance 61 should increase from zero position, while those of resistance 62 should decrease beginning with infinity (open circuit) at zero position.

It is obvious that where the range of gains to be measured is not great, resistance 62 may be dispensed with. Gains of from 10 to 25 miles have been satisfactorily measured by circuits similar to the one herein disclosed, except that a single adjustable resistance in the position of resistance 61 was used.

Further obvious changes may be made without impairing the usefulness of the circuit, and it is to be understood that the invention is entitled to the use of equivalents within the scope of the appended claims.

What is claimed is:

1. In a circuit for measuring the gain of repeaters, a source of alternating current, a direct path connected to said source, a path including a repeater to be tested and a device having a known loss connected to said source, a current indicating device, and means for connecting said indicating device alternately to said paths, said direct path comprising variable shunt resistance.

2. In a circuit for measuring the gain of repeaters, a source of alternating current, a direct path connected to said source, a path including a repeater to be tested and a device having a known loss connected to said source, a constant impedance current indicating device, and means for connecting said indicating device alternately to said paths, said direct path comprising variable shunt resistance.

3. In a circuit for measuring transmission, a direct path, a path including apparatus the transmission of which is to be measured, a current indicating device, means for connecting said indicating device alternately to said paths, and connections for sending alternating current simultaneously in series through said paths.

4. In a circuit for measuring transmission, a transformer adapted to be connected to a source of alternating current, said transformer having a divided secondary, a path for currents connected to the intermediate terminals of said secondary, a path for currents connected to the outside terminals of said secondary, one of said paths comprising the apparatus to be tested, and a current indicating device adapted to be connected alternately to said paths.

5. In a circuit for measuring repeater gains, terminals for the input and output circuits of a repeater to be tested, a plurality of artificial lines each comprising series and shunt impedance, means for severally connecting said artificial lines to said input terminals, means for impressing an electrical quantity on the line connected to said repeater, all of said lines having the same impedance to said electrical quantity, but each having a different impedance when viewed from said input terminals, and means for obtaining the ratio of said quantity to the resultant quantity in the output of said repeater.

6. In a circuit for measuring repeater gains, terminals for the input and output circuits of a repeater to be tested, a plurality of artificial lines each comprising series and shunt impedance, and means for severally connecting said artificial lines to said input terminals.

7. In a circuit for measuring repeater gains, terminals for the input and output circuits of a repeater to be tested, a plurality of artificial lines each comprising series and shunt impedance, means for severally connecting said artificial lines to said input terminals, a plurality of impedances corresponding to said artificial lines, and means operated simultaneously with said first means for severally connecting said impedances to said output terminals.

8. In a circuit for measuring repeater gains, terminals for connecting in a repeater to be tested, means for varying the impedance of the output circuit of said repeater, and means for maintaining the energy consumption in said output circuit substantially constant for all impedance values thereof.

9. In a circuit for measuring repeater gains, terminals for connecting in a repeater to be tested, a thermocouple comprising a resistance adapted to be connected in the output circuit of said repeater, an indicating instrument in the output circuit of said thermocouple, and means for simultaneously varying the impedance of said repeater output circuit and the impedance of said thermocouple output circuit, the relative values of impedances being such that the energy consumption in the repeater output circuit is maintained constant at a given reading of said indicating instrument.

10. The method of measuring the gain of a repeater which comprises sending an alternating current through a path having a known loss and through said repeater to an indicating instrument, sending a similar current through a second path having an adjustable loss to said indicating device, and adjusting said second path until the currents received by said indicating device from said paths are equal.

11. The method of measuring the transmission of electrical apparatus which comprises impressing similar electrical quantities on a path containing said apparatus and on a second path, adjusting one of said paths in large steps until the transmission through said paths is approximately equal, and then adjusting the other of said paths in relatively small steps until substantial equality of transmission is obtained.

12. The method of measuring the gain of a repeater, which comprises sending an alternating current through a path containing said repeater, introducing a loss in said path in excess of the repeater gain, sending a similar current through a second path, introducing a loss therein until the transmission through said path is equal, whereby the difference between said losses is equal to the gain of said repeater.

In witness whereof, I hereunto subscribe my name this 14th day of October, A. D. 1919.

DONALD F. WHITING.